United States Patent [19]

Griffin

[11] Patent Number: 5,072,903
[45] Date of Patent: Dec. 17, 1991

[54] PIPE-STAY CLEVIS ASSEMBLY
[75] Inventor: Tyler S. Griffin, Maryhill, Canada
[73] Assignee: Valley Metal Products Limited, Kitchener, Canada
[21] Appl. No.: 698,980
[22] Filed: May 13, 1991
[51] Int. Cl.⁵ ............................................. F16L 3/24
[52] U.S. Cl. ................................... 248/72; 248/74.1
[58] Field of Search ............... 248/65, 72, 73, 68.1, 248/228, 231.7, 58, 62, 230, 74.1; 24/486, 571, 456, 570

[56] References Cited

U.S. PATENT DOCUMENTS

| | | |
|---|---|---|
| 240,736 | 4/1881 | Leeds ........................................ 248/65 |
| 1,835,078 | 12/1931 | Ornberg .................................. 248/65 |
| 2,901,199 | 8/1959 | Thompson .............................. 248/72 |
| 2,904,293 | 9/1959 | Thompson ....................... 248/74.1 X |
| 2,997,265 | 8/1961 | Weiss ..................................... 248/68.1 |
| 3,301,513 | 1/1967 | Sugaya .................................... 248/72 |
| 3,445,081 | 5/1969 | Poussos .................................. 248/72 |
| 3,902,931 | 9/1975 | Danciger .............................. 248/230 |
| 4,550,890 | 11/1985 | Redman .............................. 248/60 X |
| 4,666,116 | 5/1987 | Lloyd ................................... 248/228 |
| 4,717,102 | 1/1988 | Pflieger ............................... 248/228 |

Primary Examiner—J. Franklin Foss
Attorney, Agent, or Firm—Anthony Asquith & Co.

[57] ABSTRACT

The assembly is used for supporting pipes, etc from the ceilings of industrial buildings. Conventional pipe hangars are of screwed rod, (typically ⅜ inch) and the assembly includes a U-shaped clevis, which fits over the screwed rod. A bolt protruding into the space between the limbs of the U-shape engages the rod, and acts to clamp the clevis to the rod. The bolt lies off-center with respect to the rod. The bolt, when tightened, also clamps the clevis to a pipe-stay member of the assembly.

6 Claims, 1 Drawing Sheet

PIPE-STAY CLEVIS ASSEMBLY

This invention relates to means for supporting tubes, conduits, and other pipes, along the walls and ceiling of a building.

BACKGROUND TO THE INVENTION

For the purpose of supporting pipes from the walls and ceilings of industrial and commercial buildings, clips of various kinds have been used. Typically, such clips have had the basic form of a staple, or alternatively of an eyelet.

One common method of mounting the pipe onto a wall has been to affix a strip of wood to the wall, to lay the pipe along the wall, and to screw or nail staples over the pipe and into the strip.

Special hangars, or pipe-stays, are available as proprietary items, which have a through-hole through which the pipe is assembled, and which are a little more sophisticated than a staple; but pipe-stays commonly also are simply screwed to the wall or ceiling.

It is usually the case, in buildings in which pipes are to be installed, that not just one pipe but many pipes are needed. The heavier pipes typically are suspended from rods which are screwed into the ceiling beams. It has been proposed to provide a clevis for attaching a pipe-stay to such a rod, for supporting the smaller pipes also from the rod, and this is an attractive proposition because the rods are already provided and installed for the purpose of supporting the heavier pipes.

However, there has not hitherto been available a suitable construction of clevis that leads to a convenient manner of arranging the pipe-stays on the rod. It has been proposed that the clevis should include a snap-action clamp, so that the clevis may be easily adjusted as to its height on the rod. The problem here is that the clamp force required to properly support the pipe is rather too high for a simple and cheap snap mechanism.

The invention is aimed at providing a construction of clevis which is simple and inexpensive to manufacture, and which will allow a pipe-stay to be fixed to a ceiling rod, in a manner that is easy and foolproof to install, and yet is secure, once installed.

GENERAL DESCRIPTION OF THE INVENTION

The invention lies in forming the clevis into a U-shape, which is of such dimensions as to receive the rod between the limbs of the U-shape. The clevis is attached to (or the clevis might be unitary with) the pipe-stay. A screw passes through a threaded hole in one of the limbs, and the screw extends partway into the space between the limbs. The screw is so positioned that when the rod lies nestled in the U-shape, between the limbs, the screw is off-centre with respect to the rod.

The screw is now tightened onto the rod, and the threads of the screw bite into the threads formed on the rod, forming a very secure locking means. On the other hand, the screw can easily be slackened and re-tightened, if the clevis should need to be re-positioned on the rod.

It is preferred for the clevis to be a separate component from the pipe-stay. The clevis should be of fairly thick material, while the pipe-stay may be thin. Preferably, for easy manufacture, both should be of sheet steel. The pipe-stay may be provided in different sizes, e.g. a short-reach and a long-reach version, and versions suitable for different sizes of conduit or pipe. All versions could be used with the same size of clevis. The size of clevis needed is dictated by the size of the rod, not by the size of the pipe. By far the most common type of rod used for pipe hanging is ⅜ inch threaded rod, but the invention is suitable for use with other sizes of rod, both threaded and unthreaded.

In the invention, it is recognised that the same screw that is used for clamping the clevis to the rod may be used also for the purpose of clamping the clevis to the pipe-stay. The use of threaded fasteners to hold interfaces together is of course a common engineering measure; but the way threaded fasteners are commonly used is to entrap the components between the nut and the head of the bolt. A screw threaded fastener cannot normally be used for the purpose of securing objects that are not so entrapped.

In the invention, the rod is not entrapped between the nut and the head of the bolt: rather, in the invention, the remote end of the bolt is used to grip the rod, while at the same time the clevis is being clamped tightly to the pipe stay in the normal threaded-fastener manner, i.e. the clevis and pipe stay are entrapped between the nut and the head of the bolt.

The invention makes use of the resilience involved in the deflection of the limbs of the U-shape, and makes use of the lost motion involved in biting the two threads together, to ensure that both interactions can be tight at the same time, i.e. to ensure both that the pipe stay and the clevis is tightly clamped together between the nut and the head of the bolt, and also to ensure that the rod is simultaneously tightly clamped by the end of the bolt.

The expression "nut" above should be construed in the general sense as being a component having a female thread.

DESCRIPTION OF PREFERRED EMBODIMENT

By way of further explanation of the invention, an exemplary embodiment of the invention will now be described with reference to the accompanying drawings, in which.

Figure 1:
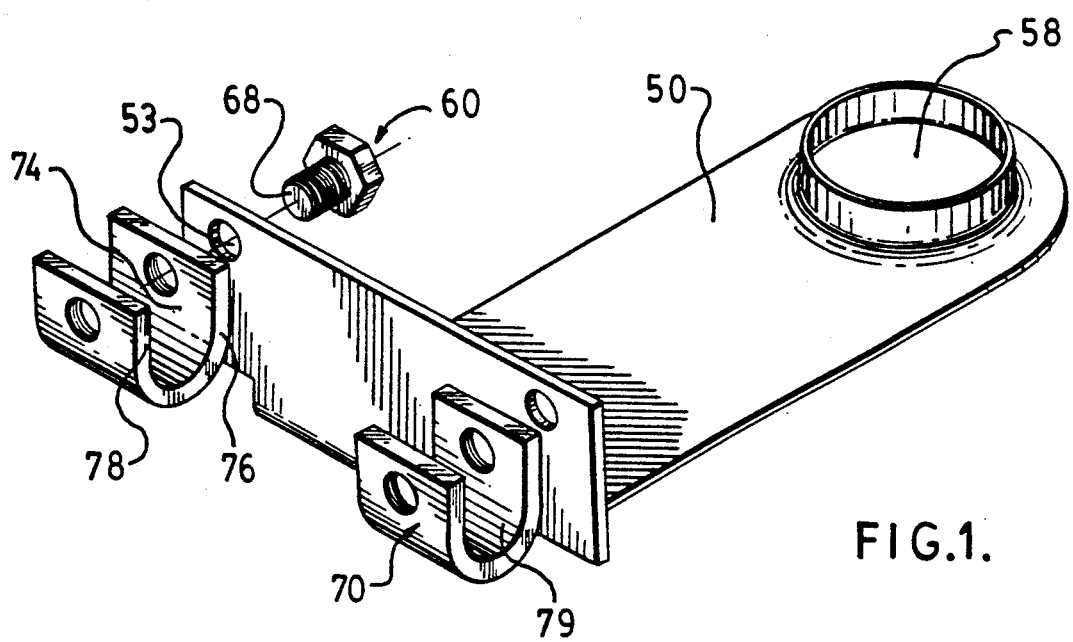
FIG. 1 is a pictorial, exploded, view of a clevis which incorporates the invention.

Shown in the accompanying drawings and described below is an example of a pipe-stay clevis assembly which embodies the invention. It should be noted that the scope of the invention is defined by the accompanying claims, and not necessarily by features of the specific embodiments.

The clevis assembly shown in the drawings comprises a pipe-stay member 50 and two clevis members 70. The clevis members are made of steel, approximately 0.11 inches thick, which is bent to a U-shape. Threaded holes 74 are formed in the first and second limbs 76,78 of the "U".

The pipe-stay member 50 includes plain (i.e., unthreaded) through-holes 53. Bolts 60 pass through the plain holes 53, through the threaded holes 74, and protrude into the space 79 formed between the two limbs 76,78.

The pipe-stay member 50 is also formed with a through-hole 58, the edges of which are swaged over, as shown.

In use, the pipe-stay clevis assembly is attached to a rod 80, and a conduit or other pipe 90 is received in the hole 58. The usual arrangement is that the rod 80 hangs vertically from the ceiling of a building or other structure, and the pipe 90 extends horizontally along, and just below, the ceiling.

The rods 80 may be provided specifically for the purpose of hanging the particular pipe 90, or the rod 80 may be already in place, for the purpose of hanging other pipes. It is the general practice that the rods used for hanging pipes from the ceilings of buildings are threaded along their length, with a nominal ⅜ inch diameter thread.

For installation, an appropriate number of pipe-stay clevises are assembled onto the pipe 90 first; then the pipe is lifted into place against the rods 80; and finally the clevis assemblies are tightened to the rods. Alternatively, the pipe-stay clevises may be fixed first to the rods 80, and then the pipe 90 passed through the holes 58.

Usually, no insulating grommet is needed at the hole 58. The pipe-stay member 50 is provided with a baked-on epoxy finish, which insulates the pipe-stay sufficiently to prevent electro-chemical action taking place with the pipe 90.

Figure 2:
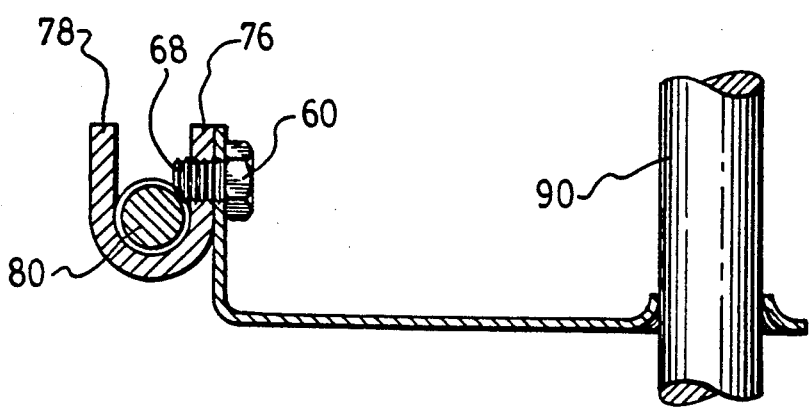
FIG. 2 is a plan view, in cross-section, showing the clevis of FIG. 1 in use.

When the pipe-stay clevis assembly of the invention is installed onto the threaded rod 80, the end 68 of the bolt 60 digs into the threads of the rod 80. The bolt 60 is positioned so that the bolt lies off-centre of the rod 80, as shown in FIG. 2. The axis of the bolt 60 lies roughly tangentially with respect to a ⅜ threaded rod 80 resting in the space 79. The bolt 60 itself has a ¼ inch thread. These dimensional relationships have the result that as the bolt 60 is being tightened, the bolt does not suddenly become tight, but, once having contacted the threads of the rod 80, the bolt 60 can still be advanced a substantial distance.

This "lost-motion" is important. The bolt 60 serves not only to lock the clevis member 70 to the rod 80, but serves also to lock the clevis member 70 to the pipe-stay member 50. As regards the fastening of the pipe-stay member to the clevis member, the bolt goes from loose to hard-tight very suddenly: and once the bolt is tight at this point, further turning of the bolt is impossible. But as regards the fastening of the bolt 60 to the rod 80, tightening takes place gradually, not instantly. Even once the bolt 60 has started to engage the rod 80, the bolt 60 can still be rotated through a number of turns. It is recognised, in the invention, that the engagement of the bolt 60 to the threads of the rod 80 should therefore be arranged to have started before the (sudden) tightening of the pipe-stay member 50 to the clevis member 70.

The margins involved are quite small, but it is recognised in the invention that sufficient precision can be obtained through using threaded components made to normal standard tolerances, without having to resort to high-precision manufacture.

The engagement of the bolt 60 with the rod 80 of course damages the threads of both the bolt and the rod, but that is not important: the portion of the thread of the bolt 60 that lies inside the threaded hole 74 remains undamaged, allowing the bolt to be slackened and re-tightened if it should become necessary to adjust the position of the clevis on the rod.

It is possible to use the same pipe-stay clevis assembly that is designed for use with ⅜ threaded rod also with ⅜ inch plain rod.

The "lost-motion", as described, is required for ensuring that the same bolt can be used to hold the clevis tightly to the rod and at the same time to hold the clevis member tightly to the pipe-stay member. When the rod is plain, the lost motion cannot come from the progressive cutting of the bolt threads into the rod threads. When the rod 80 is plain, the slight resilience of the U-shaped portion is the agency which provides the lost motion. As the bolt is tightened onto the rod, a force develops urging the limbs 76,78 to separate. The limbs, having the dimensions as described, have enough resilience to allow the tightness of the clevis member to the rod to be fully developed before the bolt suddenly tightens onto the pipe-stay member.

Figure 3:
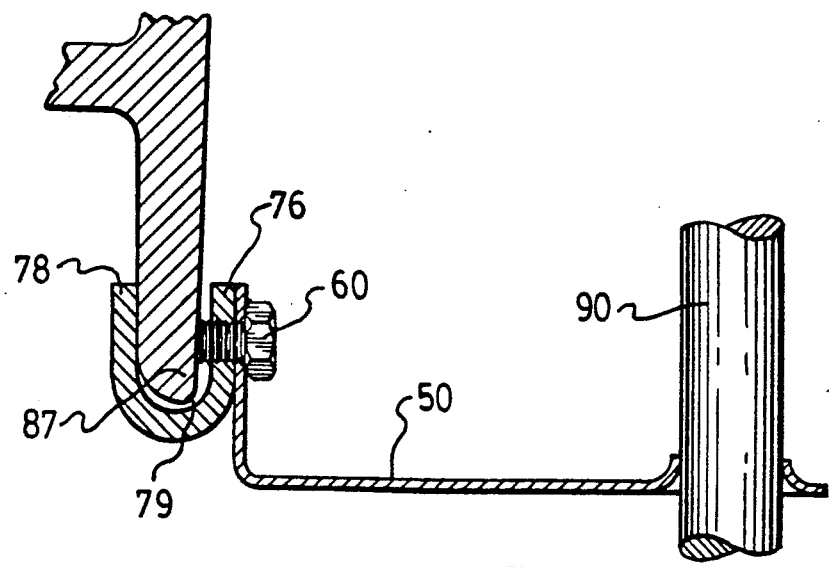
FIG. 3 is a view corresponding to FIG. 2, showing a different manner of using the clevis of FIG. 1.

Furthermore, it is possible to use the same pipe-stay clevis assembly that is designed for use with ⅜ threaded rod also with the flanges of structural beams (FIG. 3). The length of the bolt 60 is such that the bolt protrudes into the space 79 approximately ⅛ inch. The flange 87 of a typical structural beam of the kind used in buildings is a little over ¼ inch thick. Therefore, when the flange 87 is placed in the space 79 between the limbs 76,78, and the bolt tightened, the limbs have to separate slightly to accomodate that length of bolt. Again, therefore, the same bolt 60 can be used to tighten the clevis 70 to the flange 87, and at the same time to tighten the clevis 70 to the pipe-stay 50.

The clamp force of the clevis onto the flange is still adequately firm, even though the limbs 76,78 are capable of deflecting to a slight extent.

The pipe 90 may run horizontally, vertically, etc, as required. If the beam is provided with holes in the web, or is of lattice construction, the pipe may pass through the web of the beam.

It is a useful feature of the invention that the same clevis assembly that can be clamped onto the most common size of threaded rod hangars also, without modification, can be clamped onto the most common thickness of beam flanges.

It may be noted that when the assembly is clamped to a rod in the manner shown in FIG. 2, that another pipe stay 50 may be bolted to the other limb 78 of the clevis 70. The same size of bolt 60 may be used for securing this extra pipe stay. Thus, just a small number of simple standard components make the assembly very versatile, in use.

In an alternative embodiment, the two separate U-shaped clevis members 70 may be replaced with a single, long, U-shaped clevis member having two spaced-apart threaded holes 74. Strictly, only one bolt is required in that case, so long as there is some means for holding the pipe-stay from rotating relative to the clevis.

It may be noted that although the invention is particularly suitable for use when the components have the dimensions as described, the invention may be also be used with other sizes of component. The important aspect is that the components should be sized, relative to each other, so as to interact in the manner described.

It might be considered that the bolt could be arranged to pass right across between the two limbs, and that the bolt then could be used simply to draw the limbs tightly together, clamping the rod in the U-shaped space between the limbs. However, the problem with that arrangement is that there would be no sudden increase in resistance felt to turning the bolt, which would tell the operator when to stop tightening the bolt. A casual or careless operator might go on tightening the limbs together until the clevis was completely distorted. The clevis assembly of the invention, on the other hand, provides a definite stop, beyond which the bolt cannot be tightened. Therefore, when using the clevis assemblies of the invention, the operation of installing pipes requires very little from the operator by way of care and skill.

I claim:

1. Pipe-stay clevis assembly, which is suitable for supporting a pipe from a rod or flange member, wherein:

the assembly includes a pipe-stay member, having a means for retaining the pipe thereto;

the assembly includes a clevis member;

the clevis member includes a U-shaped portion, in that the member has two limbs, and the limbs define a space between the two limbs, the space being suitable for receiving the rod or flange member;

the clevis member is provided with a threaded hole, which is formed right through the thickness of a first one of the limbs;

the assembly includes a bolt;

the bolt passes through the threaded hole;

the bolt is sufficiently long that, having passed through the threaded hole, the bolt protrudes into the said space between the limbs, and protrudes to a sufficient extent that, in use, the bolt engages with the rod or flange member received in the space between the limbs;

the bolt is sufficiently short that the bolt does not reach the other of the two limbs;

the material and dimensions of the U-shaped portion are such that when the bolt is tightened onto the rod or flange received within the space, the action of tightening the bolt onto the rod or flange, is sufficient to produce a slight deflection apart of the limbs;

the pipe-stay member and the clevis member are separable components of the assembly;

the pipe-stay member is provided with a plain, un-threaded hole, formed right through the thickness of the member;

the pipe-stay member is in engagement with the said first limb of the clevis member, such that the un-threaded hole in the pipe-stay member is aligned with the threaded hole in the limb;

the bolt passes through both the un-threaded hole and through the threaded hole;

the bolt includes a head, and the pipe-stay member is secured between the head and the said first limb;

and the length of the bolt is such that, having passed through both holes, the bolt protrudes into the said space between the limbs, and protrudes to a sufficient extent that, in use, the bolt engages with the rod or flange member received in the space between the limbs.

2. Assembly of claim 1, wherein:

the length of the bolt is such that, upon tightening the bolt, the bolt becomes tightened onto the rod or flange before the pipe-stay member becomes tightened onto the limb.

3. Assembly of claim 1, wherein:

the U-shaped member is formed from a length of sheet steel;

the steel has a thickness of approximately 0.11 inches;

the steel is bent through 180 degrees in such a manner as to form the said U-shape;

the resulting space between the limbs is wide enough, and suitable for, receiving a screwed rod of a nominal ⅜ inch diameter;

the bolt is of such a length that the bolt protrudes approximately ⅜ inch from the limb into the space;

and the axis of the bolt lies approximately along a tangent to such a rod lying nestled in the space between the limbs.

4. Assembly of claim 1, wherein the other of the two limbs is provided with a threaded hole, the threaded hole being threaded right through the thickness of the said other limb.

5. Pipe-stay clevis assembly, which is suitable for supporting a pipe from a rod or flange member, wherein:

the assembly includes a pipe-stay member, having a means for retaining the pipe thereto;

the assembly includes a clevis member;

the clevis member includes a U-shaped portion, in that the member has two limbs, and the limbs define a space between the two limbs, the space being suitable for receiving the rod or flange member;

the clevis member is provided with a threaded hole, which is formed right through the thickness of a first one of the limbs;

the assembly includes a bolt;

the bolt passes through the threaded hole;

the bolt is sufficiently long that, having passed through the threaded hole, the bolt protrudes into the said space between the limbs, and protrudes to a sufficient extent that, in use, the bolt engages with the rod or flange member received in the space between the limbs;

the bolt is sufficiently short that the bolt does not reach the other of the two limbs;

the material and dimensions of the U-shaped portion are such that when the bolt is tightened onto the rod or flange received within the space, the action of tightening the bolt onto the rod or flange, is sufficient to produce a slight deflection apart of the limbs;

and the length of the bolt is such that, upon tightening the bolt, the bolt becomes tightened onto the rod or flange before the pipe-stay member becomes tightened onto the limb.

6. Assembly of claim 5, wherein:

the bolt includes a bolthead;

the bolthead is located at that end of the bolt which lies outside the first limb of the U-shaped portion;

and the length of the bolt is neither too long nor too short, in that the bolt is too short if, when the bolt is tightened onto the said rod or flange, the bolthead becomes hard-tight against the first limb before the bolt becomes tightly engaged against the rod or flange, and in that the bolt is too long if, when the bolt is tightened onto the said rod or flange, the bolt becomes so tightly engaged against the rod or flange that the bolt cannot practically be tightened further, before the bolt becomes hard-tight against the said first limb.

* * * * *